United States Patent
Nakata

(10) Patent No.: US 9,958,012 B2
(45) Date of Patent: May 1, 2018

(54) ROLLING BEARING

(71) Applicant: NSK LTD., Tokyo (JP)

(72) Inventor: Takahisa Nakata, Fujisawa (JP)

(73) Assignee: NSK LTD., Tokyo (JP)

( * ) Notice: Subject to any disclaimer, the term of this patent is extended or adjusted under 35 U.S.C. 154(b) by 0 days. days.

(21) Appl. No.: 15/120,774

(22) PCT Filed: Jan. 22, 2015

(86) PCT No.: PCT/JP2015/051716
§ 371 (c)(1),
(2) Date: Aug. 23, 2016

(87) PCT Pub. No.: WO2015/141271
PCT Pub. Date: Sep. 24, 2015

(65) Prior Publication Data
US 2016/0363170 A1    Dec. 15, 2016

(30) Foreign Application Priority Data

Mar. 19, 2014  (JP) .................................. 2014-057231

(51) Int. Cl.
*F16C 33/78*  (2006.01)
*F16J 15/34*  (2006.01)
(Continued)

(52) U.S. Cl.
CPC .......... *F16C 33/7863* (2013.01); *F16C 19/18* (2013.01); *F16C 33/805* (2013.01);
(Continued)

(58) Field of Classification Search
CPC .. F16C 33/78; F16C 33/7859; F16C 33/7863; F16C 33/7866; F16C 33/7876;
(Continued)

(56) References Cited

U.S. PATENT DOCUMENTS

| 2,856,208 A | * | 10/1958 | Cobb | .................. F16C 33/7859 277/369 |
| 2,945,707 A | * | 7/1960 | Wasley | ............... F16C 33/7853 277/348 |

(Continued)

FOREIGN PATENT DOCUMENTS

| CN | 1699081 A | 11/2005 |
| CN | 101057094 A | 10/2007 |

(Continued)

OTHER PUBLICATIONS

Machine Translation of JP 2005291450.*

(Continued)

*Primary Examiner* — Alan B Waits
(74) *Attorney, Agent, or Firm* — Sughrue Mion, PLLC

(57) ABSTRACT

The second lip has an annular protrusion formed at one end portion in a thickness direction of a lip tip portion configured to be in sliding contact with the slinger and protruding in the thickness direction, and a thickness of the lip tip portion is formed thicker than a thickness of a lip part except for the protrusion. The protrusion is formed to be reduced in width toward the tip-side in the thickness direction and configures a sliding contact part configured to be in linearly sliding contact with the slinger. The circular plate part of the slinger is formed tilted toward the seal member in the axial direction, and the slinger has an annular flange part integrally formed therewith by bending a tip of the circular plate part so as to axially cover an area above the sliding contact part of the seal member.

3 Claims, 5 Drawing Sheets

(51) Int. Cl.
*F16J 15/16* (2006.01)
*F16J 15/3256* (2016.01)
*F16C 33/80* (2006.01)
*F16C 19/18* (2006.01)
*F16J 15/3204* (2016.01)
*F16J 15/447* (2006.01)
*F16C 19/08* (2006.01)
*F16C 33/58* (2006.01)

(52) U.S. Cl.
CPC ......... *F16J 15/164* (2013.01); *F16J 15/3204* (2013.01); *F16J 15/3256* (2013.01); *F16J 15/346* (2013.01); *F16J 15/3456* (2013.01); *F16J 15/447* (2013.01); *F16C 19/08* (2013.01); *F16C 33/583* (2013.01); *F16C 2361/63* (2013.01)

(58) Field of Classification Search
CPC .............. F16C 33/7879; F16C 33/7883; F16C 33/7889; F16C 33/80
See application file for complete search history.

(56) References Cited

U.S. PATENT DOCUMENTS

| | | | | |
|---|---|---|---|---|
| 3,601,411 | A * | 8/1971 | Bourgeois | F16C 33/7863 277/349 |
| 6,595,695 | B1 * | 7/2003 | Goto | F16C 33/7853 384/482 |
| 8,308,370 | B2 * | 11/2012 | Nakagawa | F16C 33/7853 384/478 |
| 8,585,296 | B2 * | 11/2013 | Yamaguchi | F16C 33/7853 277/347 |
| 9,599,162 | B2 * | 3/2017 | Tomura | F16C 33/7883 |
| 2004/0062461 | A1 | 4/2004 | Johnson et al. | |
| 2005/0254741 | A1 | 11/2005 | Norimatsu | |
| 2007/0284829 | A1 | 12/2007 | Matsui et al. | |
| 2008/0124017 | A1 * | 5/2008 | Umekida | F16C 19/187 384/544 |
| 2009/0127796 | A1 * | 5/2009 | Kanzaki | F16J 15/3264 277/562 |
| 2009/0226124 | A1 | 9/2009 | Nakagawa et al. | |
| 2011/0075958 | A1 * | 3/2011 | Yamaguchi | F16C 33/7853 384/484 |

FOREIGN PATENT DOCUMENTS

| | | | | |
|---|---|---|---|---|
| DE | 1042308 | B * | 10/1958 | ......... F16C 33/7859 |
| DE | 102009009633 | A1 * | 8/2010 | ............... F16C 33/80 |
| EP | 2500593 | A1 * | 9/2012 | ......... F16C 33/7823 |
| JP | 2000018260 | A * | 1/2000 | ......... F16C 33/7859 |
| JP | 2001050288 | A * | 2/2001 | ......... F16C 33/7859 |
| JP | 2003148497 | A * | 5/2003 | ......... F16C 33/7859 |
| JP | 2003262233 | A * | 9/2003 | ......... F16C 33/7859 |
| JP | 2003262235 | A * | 9/2003 | ......... F16C 33/7863 |
| JP | 2005291450 | A * | 10/2005 | ............ F16C 19/184 |
| JP | 2007239987 | A * | 9/2007 | ......... B60B 27/0005 |
| JP | 4296465 | B2 * | 7/2009 | ......... F16C 33/7863 |
| JP | 2009-236161 | A | 10/2009 | |
| JP | 2010-91036 | A | 4/2010 | |
| JP | 2010-190323 | A | 9/2010 | |
| JP | 2012061875 | A * | 3/2012 | ......... F16C 33/7826 |
| JP | 4953022 | B2 | 6/2012 | |
| JP | 2012-229763 | A | 11/2012 | |
| JP | 2013044419 | A * | 3/2013 | ......... F16C 33/7879 |
| JP | 5214958 | B2 * | 6/2013 | ......... F16C 33/7879 |
| JP | 2013-224717 | A | 10/2013 | |
| JP | 5327603 | B2 * | 10/2013 | ......... F16C 33/7883 |
| JP | 2013-242006 | A | 12/2013 | |
| JP | 2013242033 | A * | 12/2013 | ......... F16C 33/7866 |
| JP | 2013242033 | A | 12/2013 | |
| WO | 01/53713 | A1 | 7/2001 | |

OTHER PUBLICATIONS

International Search Report dated Apr. 28, 2015 issued by International Searching Authority in counterpart International Application No. PCT/JP2015/051716 (PCT/ISA/210).

Written Opinion dated Apr. 28, 2015 issued by International Searching Authority in counterpart International Application No. PCT/JP2015/051716 (PCT/ISA/237).

Communication dated Nov. 17, 2017, from the State Intellectual Property Office of People's Republic of China in counterpart Application No. 201580014869.4.

* cited by examiner

US 9,958,012 B2

ROLLING BEARING

TECHNICAL FIELD

The present invention relates to a rolling bearing having a sealing device.

RELATED ART

For example, a pulley around which an endless belt such as a timing belt, a driving belt for an auxiliary machine and the like driven by an automobile engine is wrapped, for example, an idler pulley for adjusting a position and the like of the endless belt is rotatably supported to a stationary member such as a support shaft by a rolling bearing.

Since the rolling bearing is used under environments where rainwater, muddy water, dust or the like is likely to be introduced into the bearing during traveling of an automobile, a sealing device capable of preventing water, dust and the like from being introduced into the bearing has been incorporated into the rolling bearing. For example, a sealing device configured by a slinger arranged at a fixed ring (for example, an inner ring)-side and a seal member arranged at a rotary ring (for example, an outer ring)-side has been adopted. The sealing device is configured to improve sealing performance by a first lip configured to be in sliding contact with the fixed ring and a second lip configured to be in sliding contact with the slinger, which are provided for the seal member.

According to the above rolling bearing, the second lip configured to be in sliding contact with the slinger is provided, so that the sealing performance is improved. However, sliding torque of the bearing increases, and when the bearing rotates at high speed, the bearing torque increases. Therefore, the rolling bearing is required to have the high sealing performance and to reduce the bearing torque.

A technology capable of securing the high sealing performance and preventing the increase in the bearing torque is suggested in Patent Document 1, for example (refer to FIG. 7).

According to Patent Document 1, in order to prevent an increase in the bearing torque, a second lip 201 of a seal member 200 configured to be in sliding contact with a slinger 100 has a lip shape having a thin tip, and a sliding contact width of a lip tip 202 of the second lip 201 with the slinger 100 is changed in consideration of an influence of a centrifugal force of the bearing, which is to be applied when used for rotation of the outer ring. That is, by this configuration, the influence of the centrifugal force is low and the sliding contact width is high during low-speed rotation but the influence of the centrifugal force is high and the sliding contact width of the thin lip tip 202 of the second lip 201 with the slinger 100 decreases during high-speed rotation. Therefore, it is possible to suppress the sliding torque during the high-speed rotation.

However, according to the technology of Patent Document 1, since the width of the lip tip 202 of the second lip 201 configured to be in contact with the slinger 100 is changed, a phenomenon that the second lip 201 hits the slinger 100 may occur.

Also, since the slinger 100 has a circular plate part 102 that integrally protrudes from an annular cylinder part 101 in a radial direction, which is to be fitted to a fixed ring (inner ring) 300, and is formed to be parallel with an end surface 301 of the fixed ring (inner ring) 300, the slinger 100 may be tilted in an axial direction due to an assembling influence of the slinger 100. This problem causes instability of the seal sliding contact, so that the abnormal wear of the lip tip 202 of the second lip 201 may be generated.

PRIOR TECHNICAL DOCUMENTS

Patent Documents

Patent Document 1: Japanese Patent No. 4,953,022B

SUMMARY OF THE INVENTION

Problems to be Solved

The present invention has been made in view of the above problems of the related art, and an object of the present invention is to provide a rolling bearing of high sealing performance capable of suppressing bearing torque, preventing foreign matters from being introduced from an outside and stably securing favorable sealing performance.

Means for Solving the Problems

In order to achieve the above object, a first invention of the present invention is a rolling bearing including at least:
a fixed ring fixed to a stationary member;
a rotary ring arranged to be rotatable relative to the fixed ring and fixed to a rotary member;
a rolling element incorporated to be freely rollable between raceways provided at facing peripheries of the fixed ring and the rotary ring, and
a sealing device provided in an open area of an axial end portion between the fixed ring and the rotary ring and configured to seal a bearing inner space,
wherein the sealing device includes a slinger arranged in the open area of the axial end portion of the fixed ring and a seal member arranged in the open area of the axial end portion of the rotary ring,
wherein the slinger is formed to have a circular ring shape and has an annular cylinder part fixed to a periphery of the fixed ring and a circular plate part integrally protruding from the annular cylinder part in a radial direction,
wherein the seal member is arranged to be closer to the bearing inner space than the slinger, has a circular plate-shaped part having a peripheral edge fixed to the rotary ring, and also has integrally at least a first annular lip positioned at a radially opposite side to the peripheral edge fixed to the rotary ring and configured to be in sliding contact with the fixed ring and a second annular lip protruding with being tilted from an intermediate position of the circular plate-shaped part and configured to be in sliding contact with the slinger,
wherein the second lip has an annular protrusion formed at one end portion in a thickness direction of a lip tip portion configured to be in sliding contact with the slinger and protruding in the thickness direction, and a thickness of the lip tip portion is formed thicker than a thickness of a lip part except for the protrusion,
wherein the protrusion is formed to be reduced in width toward the tip-side in the thickness direction and configures a sliding contact part configured to be in linearly sliding contact with the slinger, and
wherein the circular plate part of the slinger is formed tilted toward the seal member in the axial direction, and the slinger has an annular flange part integrally formed therewith by bending a tip of the circular plate part so as to axially cover an area above the sliding contact part of the seal member.

According to a second invention, in the first invention, the other end portion of the second lip, which is located at an opposite side to the protrusion of the lip tip portion in the thickness direction, is formed to have a step and forms a labyrinth gap between the other end portion and an inner periphery of the flange part of the slinger.

According to a third invention, in the first invention, the other end portion of the second lip, which is located at an opposite side to the protrusion of the lip tip portion in the thickness direction, is formed to have a step and is configured to be in sliding contact with an inner periphery of the flange part of the slinger.

According to a fourth invention, in one of the first to third inventions, the seal member has an annular protector protruding so as to axially cover an area above an outer periphery of the flange part of the slinger.

A fifth invention is a rolling bearing including at least:
a fixed ring fixed to a stationary member;
a rotary ring arranged to be rotatable relative to the fixed ring and fixed to a rotary member;
a rolling element incorporated to be freely rollable between raceways provided at facing peripheries of the fixed ring and the rotary ring, and
a sealing device provided in an open area of an axial end portion between the fixed ring and the rotary ring and configured to seal a bearing inner space,
wherein the sealing device includes a slinger arranged in the open area of the axial end portion of the fixed ring and a seal member arranged in the open area of the axial end portion of the rotary ring,
wherein the slinger is formed to have a circular ring shape and has an annular cylinder part fixed to a periphery of the fixed ring and a circular plate part integrally protruding from the annular cylinder part in a radial direction,
wherein the seal member is arranged to be closer to the bearing inner space than the slinger, has a circular plate-shaped part having a peripheral edge fixed to the rotary ring, and also has integrally at least a first annular lip positioned at a radially opposite side to the peripheral edge fixed to the rotary ring and configured to be in sliding contact with the fixed ring and a second annular lip protruding with being tilted from an intermediate position of the circular plate-shaped part and configured to be in sliding contact with the slinger,
wherein the second lip has an annular protrusion formed at one end portion in a thickness direction of a lip tip portion configured to be in sliding contact with the slinger and protruding in the thickness direction, and a thickness of the lip tip portion is formed thicker than a thickness of a lip part except for the protrusion,
wherein the protrusion is formed to be reduced in width toward the tip-side in the thickness direction and configures a sliding contact part configured to be in linearly sliding contact with the slinger,
wherein the slinger has an annular flange part integrally formed therewith by bending a tip of the circular plate part so as to axially cover an area above the sliding contact part of the seal member, and
wherein the circular plate part of the slinger is formed with a plurality of annular concave portions, each of which is recessed toward an axially inner side, in a radial direction of the circular plate part, so that the circular plate has a plurality of stepped portions.

Effect of the Invention

According to the present invention, since the second lip has the annular protrusion formed at one end portion in the thickness direction of the lip tip portion configured to be in sliding contact with the slinger and protruding in the thickness direction and the thickness of the lip tip portion is formed thicker than the thickness of the lip part except for the protrusion, the lip tip portion is likely to be influenced by the centrifugal force during high-speed rotation. Therefore, since the second lip is deformed in a direction of getting away from the sliding contact surface with the slinger by the centrifugal force applied upon the rotation, it is possible to reduce the contact force on the sliding contact surface. Thereby, the torque increase due to the seal sliding upon the high-speed rotation and the instable seal sliding contact state due to falling of the slinger in sliding contact are suppressed.

Since the protrusion is formed to be reduced in width toward the tip-side in the thickness direction and configures the sliding contact part in linearly sliding contact with the slinger, the protrusion contacts the slinger in a very small contact width from the non-rotation and the change in sliding contact width with the slinger is suppressed even in a using rotation area, so that the stable sliding contact having a constant width is implemented.

Also, since the circular plate part of the slinger is formed tilted toward the seal member in the axial direction and the annular flange part is integrally formed with the slinger by bending the tip of the circular plate part so as to axially cover the area above the sliding contact part of the seal member, it is possible to suppress shape deformation of the slinger and to secure falling accuracy of the slinger.

Also, according to the other present invention, instead of the configuration of the present invention where the circular plate part of the slinger is formed tilted toward the seal member in the axial direction, the circular plate part is formed with the plurality of annular concave portions, which are recessed toward the axially inner side, in the radial direction of the circular plate part, so that the plurality of stepped portions is formed. Also, the annular flange part is integrally formed with the slinger by bending the tip of the circular plate part so as to axially cover the area above the sliding contact part of the seal member. Therefore, it is possible to suppress the shape deformation of the slinger and to secure the falling accuracy of the slinger.

DETAILED DESCRIPTION OF EMBODIMENTS

Hereinafter, respective embodiments of the rolling bearing according to the present invention will be described with reference to the accompanying drawings. In the meantime, each embodiment is just an embodiment of the present invention, the present invention is not construed to be limited to the embodiment, and the design change can be made within the scope of the present invention.

First Embodiment

Figure 1:
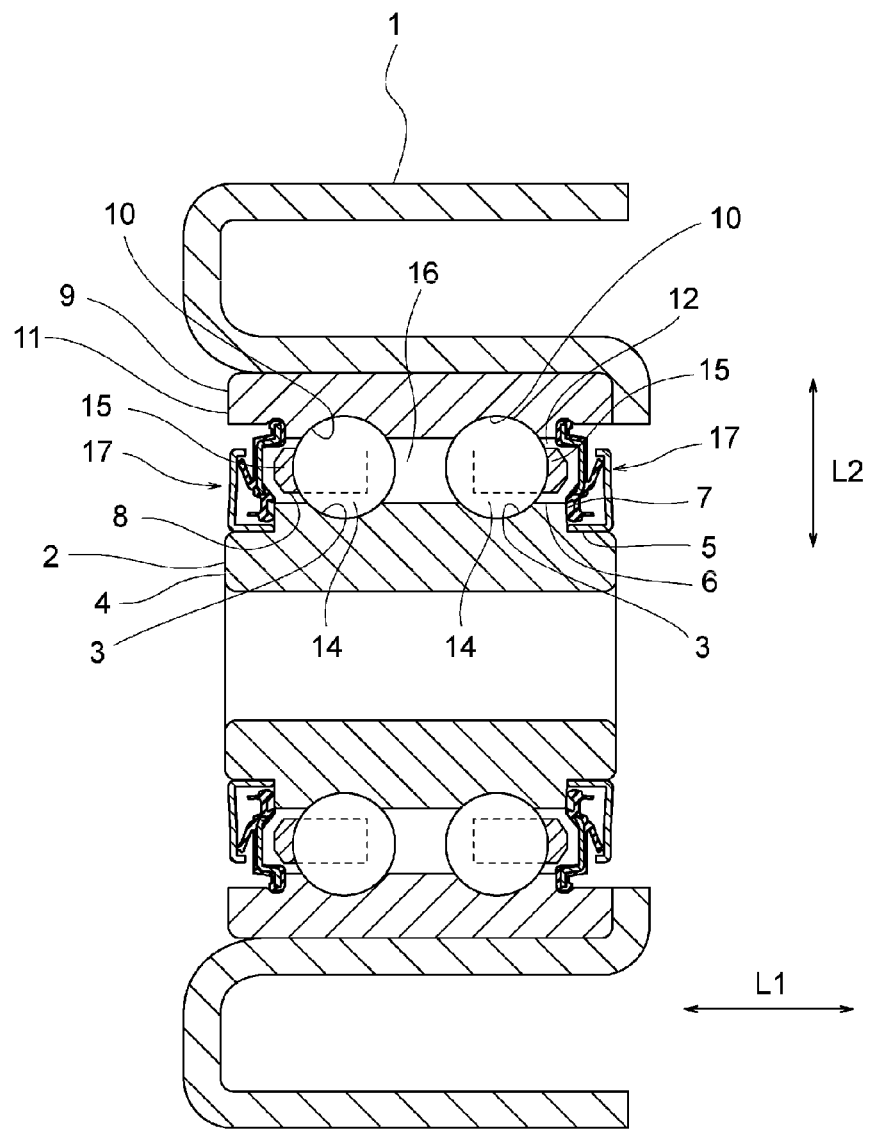
FIG. 1 is a schematic longitudinally sectional view depicting an embodiment of a rolling bearing device according to the present invention.

FIG. 1 is a schematic sectional view depicting a first embodiment where the rolling bearing of the present invention is incorporated into an idle pulley of an automobile.

The rolling bearing is a deep groove ball bearing having a plurality of rows and including at least an annular fixed ring (inner ring) 2 having a plurality of rows of inner ring raceways (inner ring raceway grooves) 3 continuous in a circumferential direction of an outer periphery, an annular rotary ring (outer ring) 9 arranged coaxially to be rotatable relative to the fixed ring 2 and having a plurality of rows of outer ring raceways (outer ring raceway grooves) 10 continuous in a circumferential direction of an inner periphery, a plurality of rolling elements 14 incorporated to be respectively rollable between the inner ring raceways 3 and the outer ring raceways 10, a holder 15 provided between the inner ring 2 and the outer ring 9 with holding the rolling elements (balls) 14 to be freely rollable, and sealing devices 17 provided in open areas of end portions in an axial direction (axial direction denoted with an arrow L1 in the drawings) between the inner ring 2 and the outer ring 9 and configured to seal a bearing inner space 16 (refer to FIG. 1).

That is, the first embodiment relates to a pulley bearing to be used for rotation of an outer ring where the inner ring 2 is fixed by fitting the inner periphery thereof to a support shaft (not shown) which is a stationary member and the outer ring 9 is fixed by fitting the outer periphery thereof to an inner surface of a pulley which is a rotary member 1.

Figure 2A:
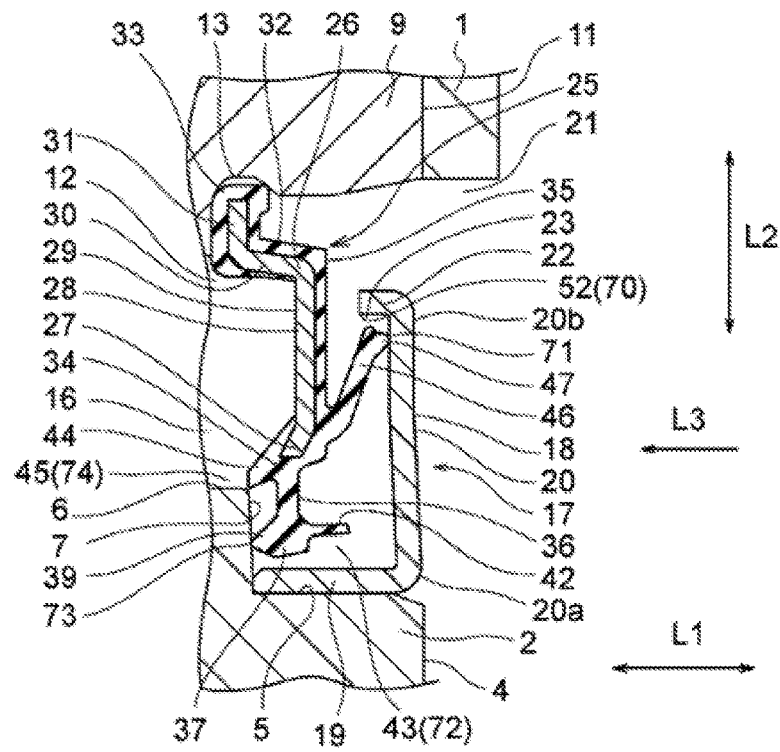
FIG. 2A is a schematic longitudinally sectional view depicting a partially enlarged part of a sealing device configuring the rolling bearing device shown in FIG. 1.
Figure 2B:
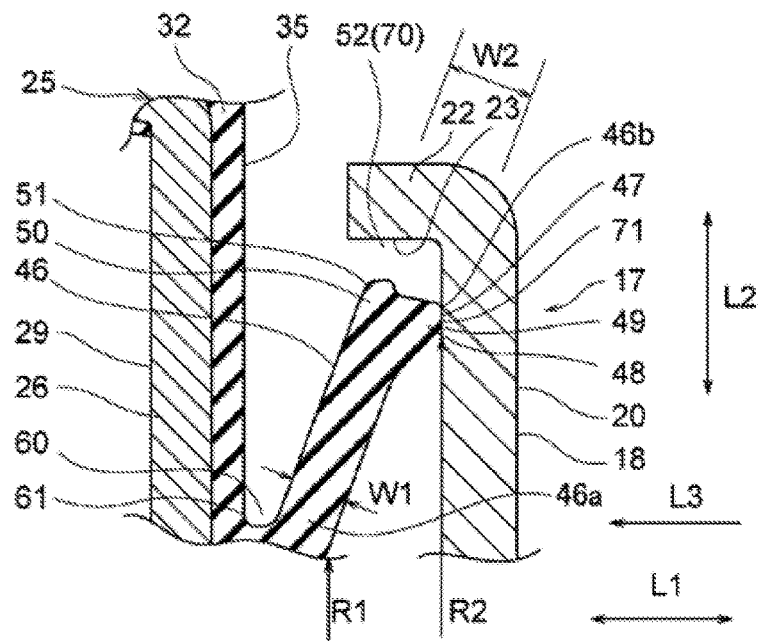
FIG. 2B is a schematic longitudinally sectional view depicting a partially enlarged part of a contact area between a lip tip portion of a second lip and a slinger of the sealing device shown in FIG. 2A.

The sealing device 17 is configured by a slinger 18 arranged in an open area 8 of an axial end portion 4 of the inner ring 2 and a seal member 25 arranged in an open area 12 of an axial end portion 11 of the outer ring 9 (refer to FIGS. 1 and 2).

The slinger 18 is formed to have a circular ring shape as a whole by a metal plate. The slinger 18 is configured by an annular cylinder part 19 fitted and fixed to a periphery of an annular small-diameter part 5 formed at the axial end portion 4 of the inner ring 2 and a circular plate part 20 having a diameter greater than the annular cylinder part 19 and integrally protruding from the annular cylinder part 19 in a radial direction (radial direction denoted with an arrow L2 in the drawings), and is arranged in the open area 8 of the axial end portion 4 of the inner ring 2.

The annular cylinder part 19 has a cylindrical shape having an inner diameter capable of being fitted and fixed to an outer periphery of the annular small-diameter part 5 of the inner ring 2 by interference-fit (refer to FIGS. 1 and 2).

The circular plate part 20 has an outer diameter smaller than an inner diameter of the axial end portion 11 of the outer ring 9 and having a size capable of forming a predetermined gap 21 between the outer diameter of the circular plate part 20 and the inner diameter of the outer ring 9.

Also, the circular plate part 20 is formed tilted toward a seal member direction (bearing inner direction denoted with an arrow L3 in the drawings) in the axial direction, and has an annular flange part 22 integrally formed by bending a tip of the circular plate part 20 in the seal member direction (bearing inner direction denoted with the arrow L3 in the drawings).

The circular plate part 20 is formed tilted toward the seal member direction (bearing inner direction denoted with the arrow L3 in the drawings) in the axial direction as it goes from an inner diameter-side 20a toward an outer diameter-side 20b (refer to FIG. 1).

The flange part 22 is substantially parallel with the annular cylinder part 19 and protrudes to form a shorter cylinder shape than the annular cylinder part 19. In the first embodiment, the flange part is formed to have a protruding length exceeding and covering a lip tip portion 47 of a second lip 46 of the seal member 25 (which will be described later) in the axial direction (bearing inner direction denoted with the arrow L3 in the drawings) (refer to FIG. 2).

The seal member 25 is configured by a core bar 26 made of a metal plate and formed to have a circular ring shape as a whole and a covering part 32 configured to entirely cover the core bar 26, integrally formed and made of an elastic material such as elastomer.

The core bar 26 is configured by an inner diameter part 27 of which a diameter becomes larger as it goes in an outer diameter direction, a circular plate part 28 integrally formed from the inner diameter part 27 toward the outer diameter direction, a circular ring part 30 integrally bent axially from an outer diameter end of the circular plate part 28 toward the bearing inner direction L3, and a second circular plate part 31 integrally bent from an end portion in the bearing inner direction L3 of the circular ring part 30 toward a radial direction (radial direction denoted with an arrow L2 in the drawings).

In the first embodiment, the inner diameter part 27 of the core bar 26 is formed to have a diameter greater than the outer periphery of the inner ring 2 (refer to FIG. 2).

The covering part 32 is integrally formed to cover a range from the inner diameter part 27 of the core bar 26 to an outer diameter part of the second circular plate part 31. The covering part 32 is configured to lock an outer peripheral edge (outer diameter) 33 to an annular locking groove 13 formed at the large-diameter part of the inner periphery of the axial end portion 11 of the outer ring 9, at a position closer to the bearing inner space 16 than the slinger 18, and is formed integrally with a first annular lip (main lip) 39 located at an inner peripheral edge (inner diameter) 34 opposite to the outer peripheral edge (outer diameter) 33 in the radial direction (radial direction denoted with the arrow L2 in the drawings) and configured to be in sliding contact with the inner ring 2.

Also, a second annular lip (sub-lip) 46, which protrudes with being tilted in the axial direction (axial direction denoted with the arrow L1 in the drawings) from an outer surface of a circular plate-shaped part 35 of the covering part 32 covering the circular plate part 28 of the core bar 26 and is configured to be in sliding contact with the slinger 18, is integrally formed (refer to FIG. 2).

In the first embodiment, only a surface part 29 of the circular plate part 28 of the core bar 26 facing toward the bearing inner space 16 is not covered by the covering part 32. However, the present invention is not limited thereto. For example, the core bar 26 may be covered over its entire range or the other part may not be covered, which is also within the scope of the present invention.

The first lip 39 has a tip-sharpened shape (width becomes narrower toward a tip-side in the thickness direction) where it protrudes toward the bearing inner space 16 in the axial direction (axial direction denoted with the arrow L1 in the drawings) at a thick part 37 integrally formed from an end portion of the circular plate-shaped part 35 of the covering part 32 via a thin part 36 toward the annular cylinder part 19 of the slinger 18, and is configured to be in linearly sliding contact with a radial wall part 7 to connect the large-diameter part 6 and small-diameter part (annular small-diameter part) 5 of the inner ring 2 in a step shape at the axial end portion 4 of the inner ring 2.

That is, the foreign matters are prevented from being introduced into the bearing inner space 16 by a sealing area (fourth sealing area 73) resulting from the sliding contact between the first lip 39 and the radial wall part 7.

In the first embodiment, an annular non-contact auxiliary lip 42, which protrudes in a thin flange shape toward the opposite axial direction (axial direction denoted with the arrow L1 in the drawings) to the first lip 39, is integrally formed at an axial direction of the thick part 37 (refer to FIG. 2A). Since the non-contact auxiliary lip 42 forms a labyrinth gap 43 between the auxiliary lip 42 and the outer periphery of the annular cylinder part 19 of the slinger 18, a sealing area (third sealing area 72) is further increased.

Also, in the first embodiment, a second auxiliary lip 44 protruding in an annular shape in the opposite axial direction (axial direction denoted with the arrow L1 in the drawings) to the second lip 46 is integrally formed at the inner peripheral edge (inner diameter) 34-side (refer to FIG. 2A). The second auxiliary lip 44 is located in a non-contact manner with respect to an end edge of the large-diameter part 6 of the inner ring 2, thereby forming a labyrinth gap 45. By the labyrinth gap 45, an additional sealing area (fifth sealing area 74) is configured.

The second lip 46 integrally protrudes with being tilted from an outer periphery of the covering part 32 close to the inner peripheral edge 34 so that a diameter thereof increases toward the lip tip portion 47 (R1<R2, when an enlarged open diameter of an inner diameter-side 46a is denoted as R1 and an enlarged open diameter of an outer diameter-side 46b is denoted as R2).

One end portion in the thickness direction of the lip tip portion 47 in sliding contact with the slinger 18 is formed with an annular protrusion 48 protruding in the thickness direction (axial direction denoted with the arrow L1 in the drawings). Also, a thickness W2 of the lip tip portion 47 is formed thicker than a thickness W1 of a lip part (part from a lip base end portion 60 to the lip tip portion 47) except for the protrusion 48.

The protrusion 48 is formed to be reduced in width toward the tip-side in the thickness direction, thereby forming a sliding contact part 49 configured to be in linearly sliding contact (line-contact) with the slinger 18. By a sealing area (second sealing area 71) of the sliding contact part 49 between the protrusion 48 and the slinger 18, the foreign matters are prevented from being introduced into the sealing area (third sealing area 72) formed by the labyrinth gap 43 between the auxiliary lip 42 and the slinger 18.

The other end portion 50 of the second lip 46, which is located at an opposite side to the protrusion 48 of the lip tip portion 47 in the thickness direction, is formed to have a step shape, thereby forming a labyrinth gap 52 between the other end portion and an inner periphery 23 of the flange part 22 of the slinger 18 (refer to FIG. 2A).

That is, an end portion of an outer diameter surface of the lip tip portion 47 of the second lip 46 is formed integrally with an annular step portion 51 protruding in a step shape toward the radial direction.

By the sealing area (first sealing area 70) of the labyrinth gap 52, the foreign matters are prevented from being introduced into the sealing area (second sealing area 71) of the sliding contact part 49 between the protrusion 48 and the slinger 18. Meanwhile, in the first embodiment, the annular step portion 51 is formed to have a trapezoidal s section, and a tip end surface thereof is formed to have a flat shape.

As described above, according to the first embodiment, since the second lip 46 has the annular protrusion 48 formed at one end portion in the thickness direction of the lip tip portion 47 in sliding contact with the slinger 18 and protruding in the thickness direction, and the thickness W2 of the lip tip portion 47 is formed thicker than the thickness W1 of the lip part except for the protrusion 48, the lip tip portion 47 is likely to be influenced by a centrifugal force applied during high-speed rotation. Therefore, since the second lip 46 is deformed in a direction of getting away from the sliding contact surface with the slinger 18 by the centrifugal force applied during the rotation, it is possible to reduce the contact force on the sliding contact surface. Thereby, the torque increase due to the seal sliding upon the high-speed rotation and the instable seal sliding contact state due to falling of the slinger 18 in sliding contact are suppressed.

Since the protrusion 48 is formed to be reduced in width toward the tip-side in the thickness direction and configures the sliding contact part in linearly sliding contact with the slinger 18, the protrusion 48 contacts the slinger in a very small contact width from the non-rotation and the change in sliding contact width with the slinger 18 is suppressed even in a using rotation area, so that the stable sliding contact having a constant width is implemented.

Also, since the circular plate part 20 of the slinger 18 is formed tilted toward the seal member in the axial direction and the annular flange part 22 is integrally formed with the slinger 20 by bending the tip of the circular plate part 20 so as to axially cover the area above the sliding contact part 40 of the seal member 25, it is possible to suppress shape deformation of the slinger 18 and to secure falling accuracy of the slinger.

Also, since the labyrinth gap 52 is formed between the other end portion 50 of the lip tip portion 47 and the inner periphery of the flange part 22 of the slinger 18, the sealing area 70 increases and the introduction of the foreign matters from the outside can be prevented, in addition to the sealing area by the protrusion 48 in contact with the slinger 18.

Second Embodiment

Figure 3:
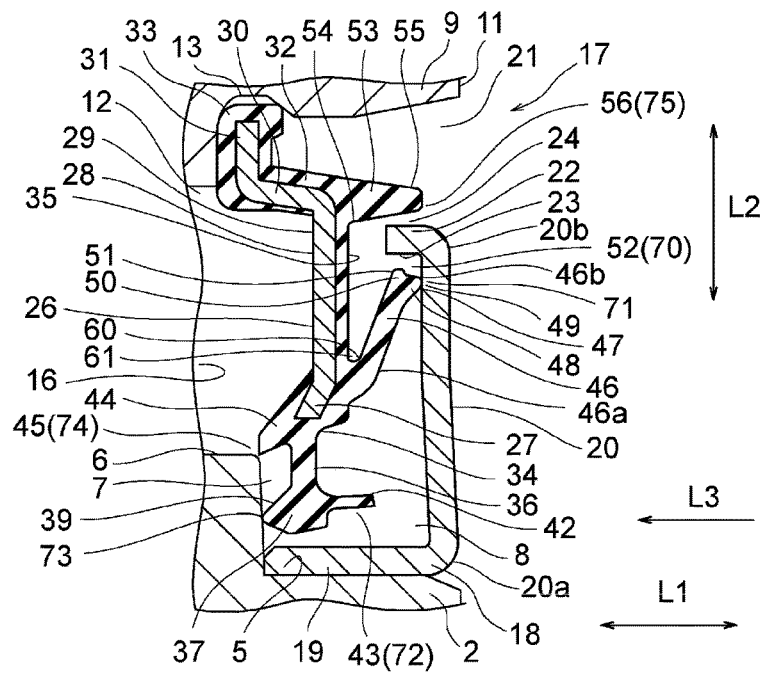
FIG. 3 depicts a second embodiment of the rolling bearing device according to the present invention, and is a schematic longitudinally sectional view depicting a partially enlarged part of the sealing device.

FIG. 3 depicts a second embodiment of the rolling bearing according to the present invention.

In the second embodiment, the seal member 25 is formed with an annular protector 53 configured to cover an area above an outer periphery 24 of the flange part 22 of the slinger 18 in the axial direction (axial direction denoted with the arrow L1 in the drawings).

The protector 53 integrally protrudes annularly in a predetermined thickness from the outer diameter-side end portion of the circular plate-shaped part 35 of the covering part 32 toward the axial direction (axial direction denoted with the arrow L1 in the drawings).

The protector 53 is formed to be thinner from a base end-side 54 toward a tip-side 55, and forms a labyrinth gap 56 between the protector and the outer periphery 24 of the flange part 22 of the slinger 18.

That is, according to the second embodiment, a sealing area (sixth sealing area 75) is further increased by the labyrinth gap 56, so that the sealing performance is improved.

Therefore, according to the second embodiment, since the additional labyrinth gap 56 is formed between an inner periphery of the protector 53 and the outer periphery 24 of the flange part 22 of the slinger 18, the sealing area 75 is further increased, so that it is possible to prevent the foreign matters from being introduced from the outside, together with the sealing area 70 formed between the other end portion 50 of the lip tip portion 47 and the inner periphery of the flange part 22 of the slinger 18.

The other configurations and operational effects are the same as the first embodiment.

Third Embodiment

Figure 4:
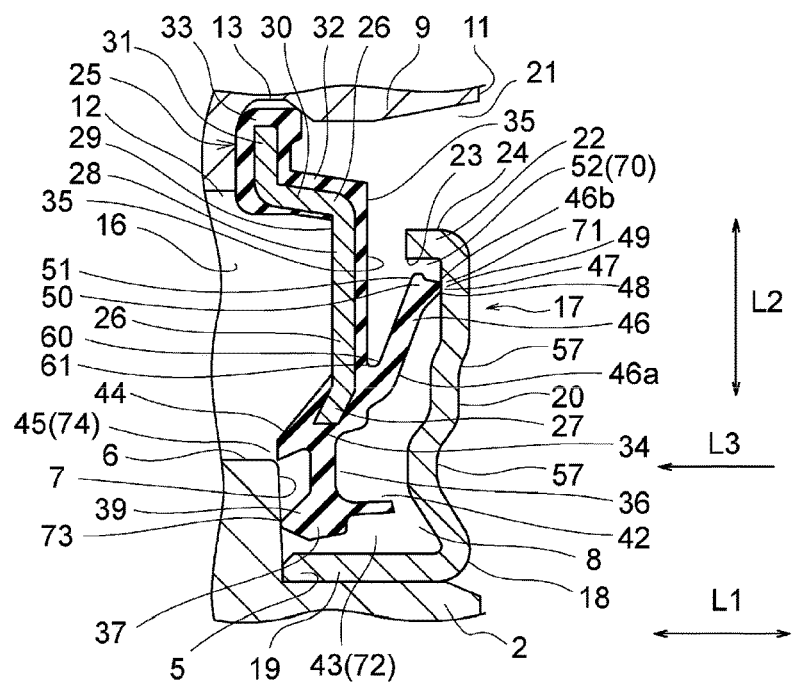
FIG. 4 depicts a third embodiment of the rolling bearing device according to the present invention, and is a schematic longitudinally sectional view depicting a partially enlarged part of the sealing device.

FIG. 4 depicts a third embodiment of the rolling bearing according to the present invention.

In the third embodiment, the circular plate part 20 of the slinger 18 is formed with a plurality of annular concave portions 57, which are recessed toward the axially (the axial direction denoted with the arrow L1 in the drawings) inner side, in the radial direction (radial direction denoted with the arrow L2 in the drawings) of the circular plate part 20, so that a plurality of stepped portions is formed, unlike the first embodiment where the circular plate part is formed tilted.

In the meantime, a shape, an arrangement number and the like of the annular concave portion 57 are not particularly limited, and can be appropriately design-changed within the scope of the present invention.

That is, when the circular plate part 20 of the slinger 18 is formed like the third embodiment, the stiffness increases and the tilting in the axial direction is prevented.

According to the third embodiment, the circular plate part 20 of the slinger 18 is formed with the plurality of annular concave portions 57, which are recessed toward the axially inner side, in the radial direction of the circular plate part 20, so that the plurality of stepped portions is formed. Therefore, it is possible to suppress the shape deformation of the slinger 18 and to secure the falling accuracy of the slinger 18.

The other configurations and operational effects are the same as the first embodiment.

Fourth Embodiment

Figure 5:
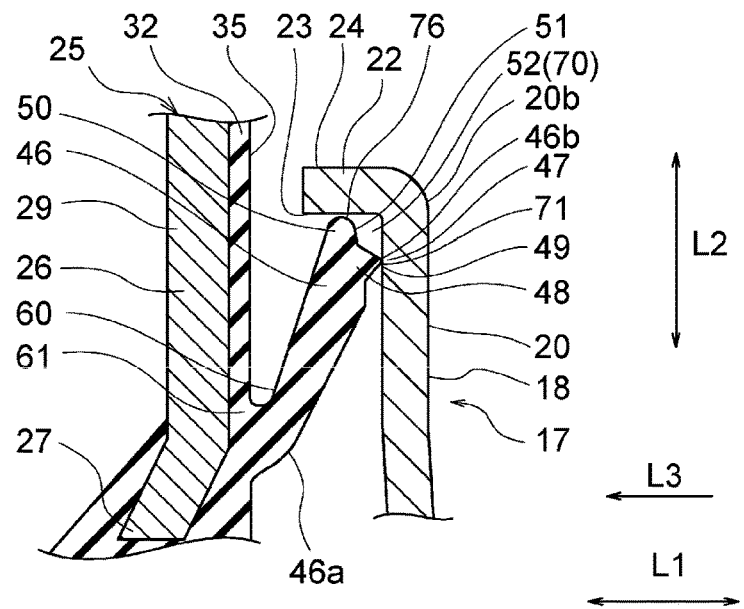
FIG. 5 depicts a fourth embodiment of the rolling bearing device according to the present invention, and is a schematic longitudinally sectional view depicting a partially enlarged part of the sealing device.

FIG. 5 depicts a fourth embodiment of the rolling bearing according to the present invention.

In the fourth embodiment, the annular step portion 51 of the second lip 46 protruding in the opposite side to the protrusion 48 of the lip tip portion 47 with respect to the thickness direction is in sliding contact with the inner periphery 23 of the flange part 22 of the slinger 18.

Also, in the fourth embodiment, a tip sliding contact surface of the annular step portion 51 in sliding contact with the inner periphery 23 of the flange part 22 is formed to have an R-shaped section. However, the tip sliding contact surface may also be formed to have a trapezoidal section and a flat shape.

According to the fourth embodiment, since the contact sealing area (seventh sealing area 76) is formed between the tip of the annular step portion 51 and the inner periphery 23 of the flange part 22, the sealing performance is improved.

Therefore, according to the fourth embodiment, since the other end portion 50 of the lip tip portion 47 is in sliding contact with the inner periphery of the flange part 22 of the slinger 18, the sealing area 76 increases and the introduction of the foreign matters from the outside can be prevented, together with the sealing area 70 by the protrusion 58 in contact with the slinger 18.

The other configurations and operational effects are the same as the first embodiment.

Fifth Embodiment

Figure 6:
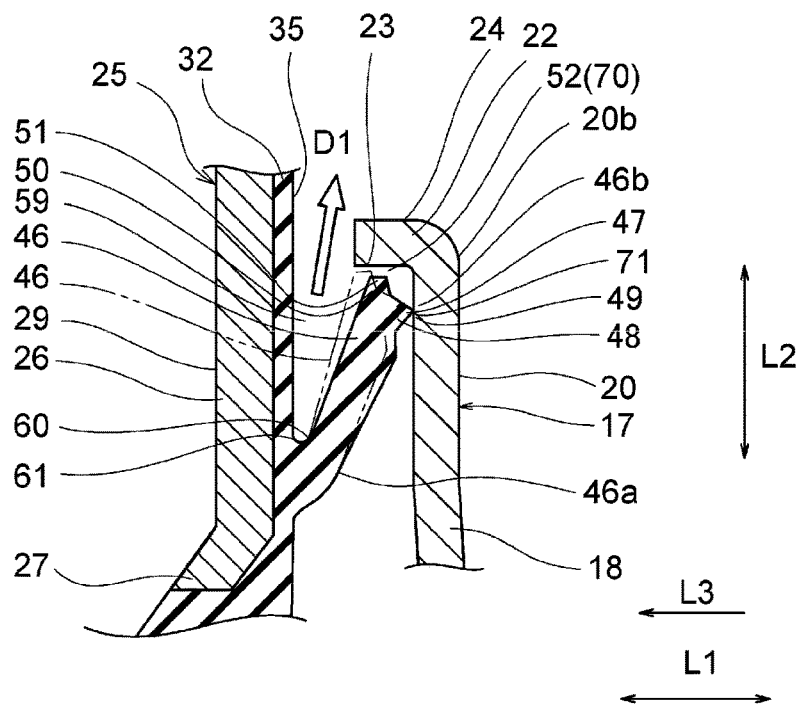
FIG. 6 depicts a fifth embodiment of the rolling bearing device according to the present invention, and is a schematic longitudinally sectional view depicting a partially enlarged part of the sealing device.
Figure 7:
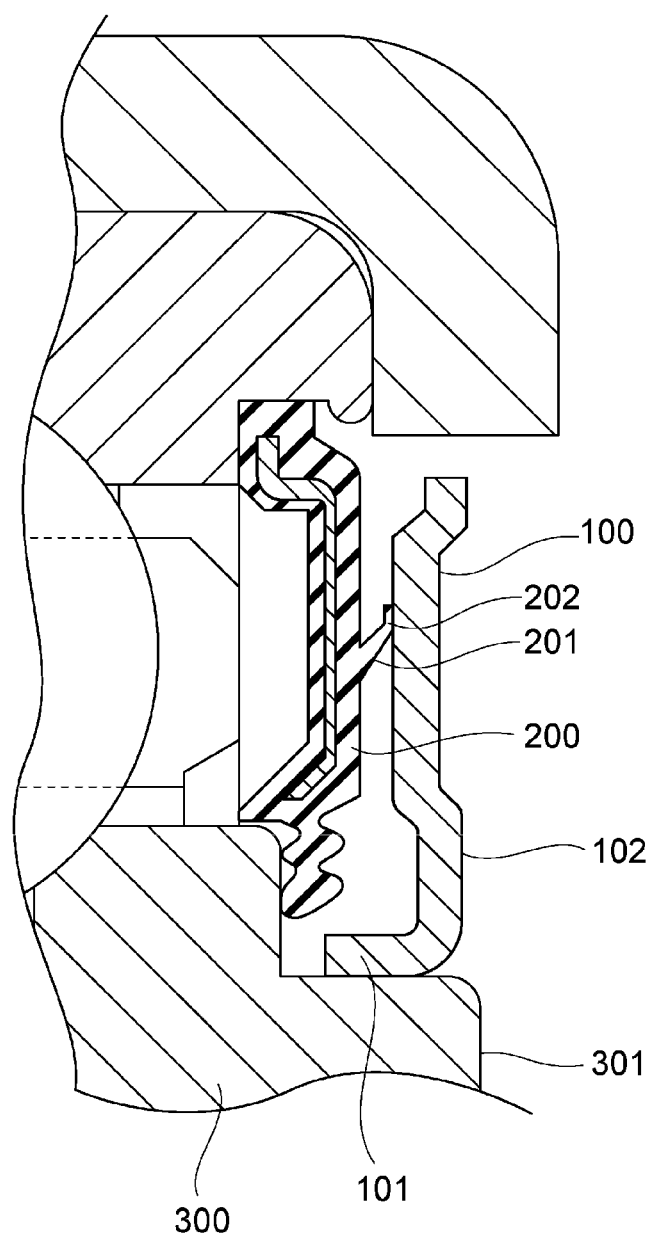
FIG. 7 is a schematic longitudinally sectional view depicting a partially enlarged part of a sealing device of a rolling bearing device according to the related art.

FIG. 6 depicts a fifth embodiment of the rolling bearing according to the present invention.

In the fifth embodiment, the flange part 22 of the slinger 18 is formed to protrude in a protruding length to cover an area above the lip tip portion 47 of the second lip 46 of the seal member 25 in the axial direction (axial direction denoted with the arrow L1 in the drawings). That is, a bent amount (axial length) of the flange part 22 is set to the thickness of the lip tip portion 47.

According to the fifth embodiment, even when the lip tip portion 47 of the second lip 46 is separated from the slinger 18 and is thus in a non-contact state (a state shown with a dashed-two dotted line in FIG. 6) during the high-speed rotation, it is possible to secure a foreign matter discharge path 59 having no catching portion because the flange part 22 of the slinger 18 is formed to protrude in a protruding length to cover the area above the lip tip portion 47 of the second lip 46 of the seal member 25 in the axial direction (the axial direction denoted with the arrow L1 in the drawings).

That is, even when the foreign matters are deposited in a bent area 61 formed at a boundary between an outer area in the radial direction of a base end 60 of the second lip 46 and the circular plate-shaped part 35, the deposited foreign matters can be discharged to the outside by the centrifugal force without being caught to the end edge of the flange part 22. An arrow D1 of FIG. 6 indicates a foreign matter discharge direction.

INDUSTRIAL APPLICABILITY

The rolling bearing of the present invention is not limited to the deep groove ball bearing having a plurality of rows and, and can also be applied to the other well-known rolling bearings such as a rolling bearing having a single row. Also, the rolling element is not limited to the ball, and a roller or the like can be adopted.

In the above embodiments, the rolling bearing of the present invention is incorporated into the idle pulley of an automobile. However, for example, the rolling beating can also be used for a tension pulley that is to be used for adjusting a tensional force of an endless belt, and can be appropriately design-changed within the scope of the present invention.

The subject application is based on a Japanese Patent Application No. 2014-57231 filed on Mar. 19, 2014, which is herein incorporated for reference.

DESCRIPTION OF REFERENCE NUMERALS

1: rotary member, 2: fixed ring (inner ring), 3: inner ring raceway, 4: axial end portion, 8: open area, 9: rotary ring (outer ring), 10: outer ring raceway, 11: axial end portion, 12: open area, 14: rolling element, 16: bearing inner space, 17: sealing device, 18: slinger, 19: annular cylinder part, 20: circular plate part, 22: flange part, 25: seal member, 33: outer peripheral edge, 39: first lip, 46: second lip, 47: lip tip, 48: protrusion, 49: sliding contact part, W2: thickness of lip tip portion, W1: thickness of lip part except for protrusion

The invention claimed is:

1. A rolling bearing comprising:
a fixed ring fixed to a stationary member;
a rotary ring arranged to be rotatable relative to the fixed ring and fixed to a rotary member;
a rolling element incorporated to be rollable between raceways provided at facing peripheries of the fixed ring and the rotary ring, and
a sealing device provided in an open area of an axial end portion between the fixed ring and the rotary ring and configured to seal a bearing inner space,
wherein the sealing device includes a slinger arranged in the open area of the axial end portion of the fixed ring and a seal member arranged in the open area of the axial end portion of the rotary ring,
wherein the slinger is formed to have a circular ring shape and has an annular cylinder part fixed to a periphery of the fixed ring, a circular plate part integrally protruding from the annular cylinder part in a radial direction, and an annular flange part integrally protruding from an end portion of the circular plate part in an axial direction,
wherein the seal member is arranged to be closer to the bearing inner space than the slinger, has a circular plate-shaped part having a peripheral edge fixed to the rotary ring, and also has integrally at least a first annular lip positioned at a radially opposite side to the peripheral edge fixed to the rotary ring and configured to be in sliding contact with the fixed ring and a second annular lip protruding and tilted from an intermediate position of the circular plate-shaped part and configured to be in sliding contact with the slinger,
wherein the second lip has an annular protrusion formed at one end portion in a thickness direction of a lip tip portion configured to be in sliding contact with the circular plate part of the slinger and protruding in the thickness direction, and a thickness of the lip tip portion is formed thicker than a thickness of a lip part, the lip part being a portion of the second lip other than the protrusion,
wherein the protrusion is formed to be reduced in width toward the tip-side in the thickness direction and configures a sliding contact part configured to be in linearly sliding contact with the circular plate part of the slinger, and
wherein the circular plate part of the slinger is formed tilted toward the seal member in the axial direction,
wherein the annular flange part of the circular plate part is configured to axially cover an area above the sliding contact part of the seal member,
wherein the other end portion of the second lip, which is located at an opposite side to the protrusion of the lip tip portion in the thickness direction, is formed to have an annular step portion protruding in a step shape toward the radial direction, and
wherein a labyrinth gap is formed between the annular step portion and an inner periphery of the flange part of the slinger.

2. The rolling bearing according to claim 1, wherein the seal member has an annular protector protruding so as to axially cover an area above an outer periphery of the flange part of the slinger.

3. A rolling bearing comprising:
a fixed ring fixed to a stationary member;
a rotary ring arranged to be rotatable relative to the fixed ring and fixed to a rotary member;
a rolling element incorporated to be rollable between raceways provided at facing peripheries of the fixed ring and the rotary ring, and
a sealing device provided in an open area of an axial end portion between the fixed ring and the rotary ring and configured to seal a bearing inner space,
wherein the sealing device includes a slinger arranged in the open area of the axial end portion of the fixed ring and a seal member arranged in the open area of the axial end portion of the rotary ring,
wherein the slinger is formed to have a circular ring shape and has an annular cylinder part fixed to a periphery of the fixed ring and a circular plate part integrally protruding from the annular cylinder part in a radial direction,
wherein the seal member is arranged to be closer to the bearing inner space than the slinger, has a circular plate-shaped part having a peripheral edge fixed to the rotary ring, and also has integrally at least a first annular lip positioned at a radially opposite side to the peripheral edge fixed to the rotary ring and configured to be in sliding contact with the fixed ring and a second annular lip protruding and tilted from an intermediate position of the circular plate-shaped part and configured to be in sliding contact with the slinger,
wherein the second lip has an annular protrusion formed at one end portion in a thickness direction of a lip tip portion configured to be in sliding contact with the slinger and protruding in the thickness direction, and a thickness of the lip tip portion is formed thicker than a thickness of a lip part, the lip part being a portion of the second lip other than except for the protrusion,
wherein the protrusion is formed to be reduced in width toward the tip-side in the thickness direction and configures a sliding contact part configured to be in linearly sliding contact with the slinger,
wherein the slinger has an annular flange part integrally formed therewith by bending a tip of the circular plate part so as to axially cover an area above the sliding contact part of the seal member, and
wherein the circular plate part of the slinger is formed with a plurality of annular concave portions, each of which is recessed toward an axially inner side, in a radial direction of the circular plate part, so that the circular plate has a plurality of stepped portions.

* * * * *